United States Patent
Scott et al.

(10) Patent No.: US 9,311,099 B2
(45) Date of Patent: Apr. 12, 2016

(54) SYSTEMS AND METHODS FOR LOCKING BRANCH TARGET BUFFER ENTRIES

(71) Applicants: Jeffrey W. Scott, Austin, TX (US); William C. Moyer, Dripping Springs, TX (US)

(72) Inventors: Jeffrey W. Scott, Austin, TX (US); William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 435 days.

(21) Appl. No.: 13/955,106

(22) Filed: Jul. 31, 2013

(65) Prior Publication Data

US 2015/0039870 A1 Feb. 5, 2015

(51) Int. Cl.
G06F 9/22 (2006.01)
G06F 9/38 (2006.01)

(52) U.S. Cl.
CPC .................... *G06F 9/3806* (2013.01)

(58) Field of Classification Search
CPC ........................................................ G06F 9/38
See application file for complete search history.

(56) References Cited

U.S. PATENT DOCUMENTS

| | | | |
|---|---|---|---|
| 5,530,825 A | 6/1996 | Black et al. | |
| 6,253,288 B1 * | 6/2001 | McAllister | G06F 12/0875 711/110 |
| 6,895,498 B2 * | 5/2005 | McDonald | G06F 9/3844 711/133 |
| 7,620,750 B2 * | 11/2009 | Gouder De Beauregard | G06F 3/0613 710/33 |
| 7,676,633 B1 * | 3/2010 | Fair | G06F 12/0897 711/122 |
| 7,707,396 B2 * | 4/2010 | Bradford | G06F 9/30094 712/238 |
| 7,895,422 B2 * | 2/2011 | Moyer | G06F 9/3802 712/239 |
| 8,024,517 B2 * | 9/2011 | LaFrese | G06F 12/0804 710/35 |
| 8,090,934 B2 * | 1/2012 | Koc | G06F 9/3806 712/238 |
| 8,171,269 B2 * | 5/2012 | Rabinovitch | G06F 9/3806 712/238 |
| 8,244,988 B2 * | 8/2012 | Cantin | G06F 12/084 711/144 |
| 8,832,418 B2 * | 9/2014 | McDonald | G06F 9/3806 712/239 |
| 8,874,884 B2 * | 10/2014 | Venkumahanti | G06F 9/3806 712/238 |
| 9,052,910 B2 * | 6/2015 | Hall | G06F 9/381 |
| 2006/0031839 A1 * | 2/2006 | Kang | G06F 9/544 718/102 |
| 2009/0217017 A1 | 8/2009 | Alexander et al. | |
| 2011/0296096 A1 * | 12/2011 | Zou | G06F 9/30174 711/105 |
| 2015/0006863 A1 * | 1/2015 | McGowan | G06F 11/3636 712/227 |

* cited by examiner

*Primary Examiner* — Cheng-Yuan Tseng

(57) ABSTRACT

A data processing system includes a processor configured to execute processor instructions and a branch target buffer having a plurality of entries. Each entry is configured to store a branch target address and a lock indicator, wherein the lock indicator indicates whether the entry is a candidate for replacement, and wherein the processor is configured to access the branch target buffer during execution of the processor instructions. The data processing system further includes control circuitry configured to determine a fullness level of the branch target buffer, wherein in response to the fullness level reaching a fullness threshold, the control circuitry is configured to assert the lock indicator of one or more of the plurality of entries to indicate that the one or more of the plurality of entries is not a candidate for replacement.

17 Claims, 3 Drawing Sheets

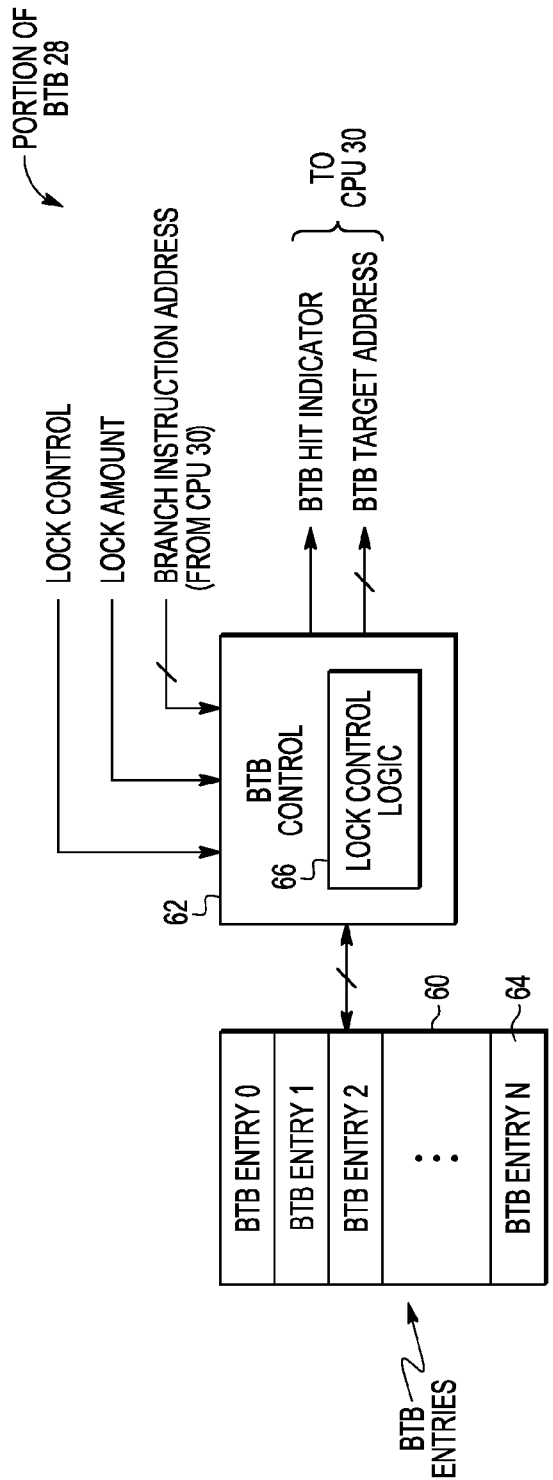
FIG. 3
FIG. 4

SYSTEMS AND METHODS FOR LOCKING BRANCH TARGET BUFFER ENTRIES

BACKGROUND

1. Field

This disclosure relates generally to data processors, and more specifically, to the execution of branch instructions by data processors.

2. Related Art

With embedded processing systems, area required by a circuit is a key metric to optimize. In doing so, generally a smaller branch target buffer is preferred to a larger one. In many cases, a small branch target buffer works fine in accelerating a majority of the branches. However, there are also instances of code where the number of branches is large and the branches are executed only once (referred to as "one and done"). In these cases, the usefulness of the branch target buffer is effectively zero when the size of the branch target buffer is less than the number of taken branches due to the constant thrashing of the branch target buffer contents.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 3 illustrates in block diagram form a portion of the branch target buffer of FIG. 1 in accordance with one form of the present invention;

FIG. 4 illustrates in diagrammatic form a first embodiment of an entry in the branch target buffer of FIG. 1 corresponding to a group of fetched data processing instructions in accordance with the present invention;

DETAILED DESCRIPTION

Embodiments of systems and methods disclosed herein provide capability to lock the contents of some or all of the entries in a branch target buffer when a specified number (or percentage) of the entries are occupied. The ability to lock the contents can apply to all styles of branch target buffers including direct mapped, fully associative, and set associative. For set associative, the lock can occur once all ways of a set are valid, such that no replacements can occur. In addition, a portion of the branch target buffer can be allowed to lock, while the remaining portion could be replaceable. Instead of not gaining any performance advantage with the branch target buffer, some performance advantage can still occur due to having locked in a subset of the total number of unique taken branches, as further described herein.

Figure 1:
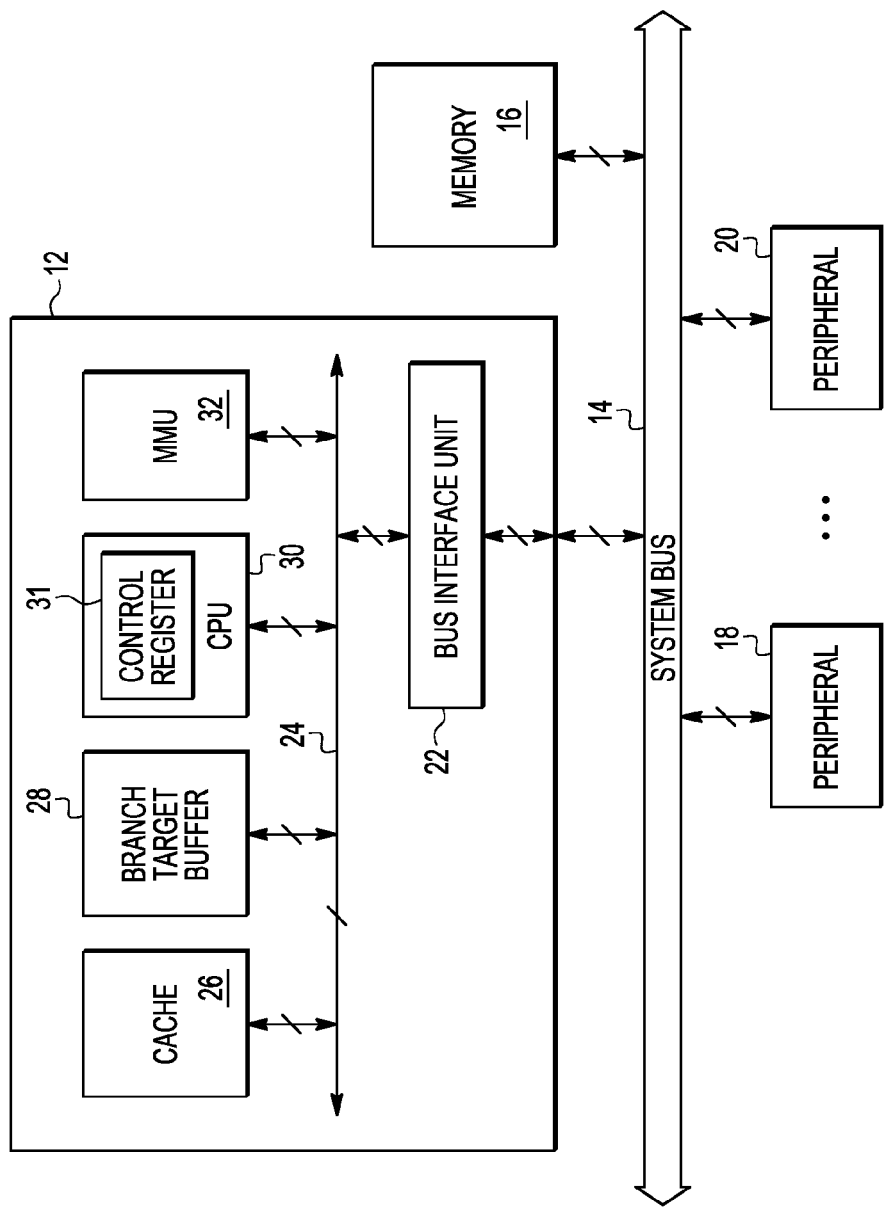
FIG. 1 illustrates in block diagram form a data processing system having a branch target buffer in accordance with one form of the present invention.

FIG. 1 illustrates, in block diagram form, a data processing system 10 that can be used to implement various embodiments of the present disclosure. Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. The memory 16 is a system memory that is coupled to the system bus 14 by a bidirectional conductor that, in one form, has multiple conductors. In the illustrated form each of peripherals 18 and 20 is coupled to the system bus 14 by bidirectional multiple conductors as is the processor 12. The processor 12 includes a bus interface unit 22 that is coupled to the system bus 14 via a bidirectional bus having multiple conductors. The bus interface unit 22 is coupled to an internal bus 24 via bidirectional conductors. The internal bus 24 is a multiple-conductor communication bus. Coupled to the internal bus 24 via respective bidirectional conductors is a cache 26, a branch target buffer (BTB) 28, a central processing unit (CPU) 30 and a memory management unit (MMU) 32. The CPU 30 is a processor for implementing data processing operations. Within the CPU 30 is a control register 31 which stores values for branch to buffer lock control and lock amount signals, among others. Each of cache 26, BTB 28, CPU 30 and MMU 32 are coupled to the internal bus via a respective input/output (I/O) port or terminal.

In operation, the processor 12 functions to implement a variety of data processing functions by executing a plurality of data processing instructions. Cache 26 is a temporary data store for frequently-used information that is needed by the CPU 30. Information needed by the CPU 30 that is not within cache 26 is stored in memory 16. The MMU 32 controls interaction of information between the CPU 30 and the cache 26 and the memory 16.

The bus interface unit 22 is only one of several interface units between the processor 12 and the system bus 14. The bus interface unit 22 functions to coordinate the flow of information related to instruction execution including branch instruction execution by the CPU 30. Control information and data resulting from the execution of a branch instruction are exchanged between the CPU 30 and the system bus 14 via the bus interface unit 22.

The BTB 28 is a buffer for storing a plurality of entries. Each of the entries corresponds to a fetch group of branch target addresses associated with branch instructions that are executed by the CPU 30. Therefore, CPU 30 selectively generates branch instruction addresses which are sent via the internal bus 24 to the BTB 28. The BTB 28 contains a subset of all of the possible branch instruction addresses that may be generated by CPU 30. In response to receiving a branch instruction address from CPU 30, the BTB 28 provides a branch target address to the CPU 30 that corresponds to a branch instruction within a plurality of instructions. The branch target address which the BTB 28 provides is both a valid address and may be predicted to be taken.

Figure 2:
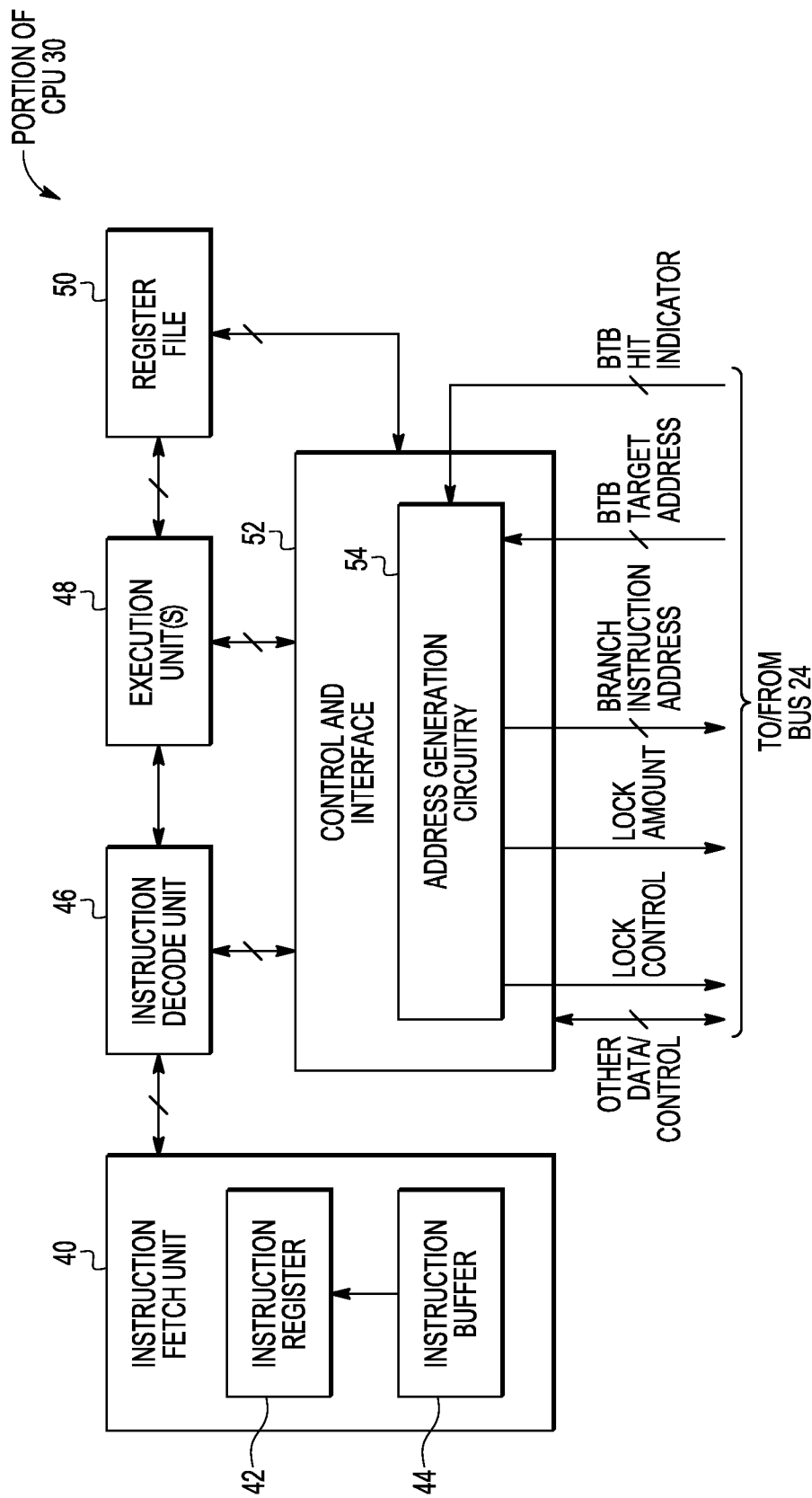
FIG. 2 illustrates in block diagram form a portion of a central processing unit (CPU) of the data processing system of FIG. 1 in accordance with one form of the present invention.

Illustrated in FIG. 2 is a detailed portion of the CPU 30 of FIG. 1 that relates to the execution of instructions and the use of the BTB 28. An instruction fetch unit 40 is illustrated as including both an instruction buffer 44 and an instruction register 42. The instruction buffer 44 has an output that is connected to an input of the instruction register 42. A multiple conductor bidirectional bus couples a first output of the instruction fetch unit 40 to an input of an instruction decode unit 46 for decoding fetched instructions. An output of the instruction decode unit 46 is coupled via a multiple conductor bidirectional bus to one or more execution unit(s) 48. The one or more execution unit(s) 48 is coupled to a register file 50 via a multiple conductor bidirectional bus. Additionally, each of the instruction fetch units 40, the instruction decode unit 46, the one or more execution unit(s) 48 and the register file 50 is coupled via separate bidirectional buses to respective input/output terminals of a control and interface unit 52 that interfaces to and from the internal bus 24.

The control and interface unit 52 has address generation circuitry 54 having a first input for receiving a BTB Hit Indicator signal via a multiple conductor bus from the branch target buffer 28 via the internal bus 24. The address generation circuitry 54 also has a second input for receiving a BTB Target Address via a multiple conductor bus from the MMU 32 via the internal bus 24. The address generation circuitry 54 has a multiple conductor output for providing a branch instruction address signal to the branch target buffer 28 via the internal bus 24, and single conductor outputs for providing lock control and lock amount signals to branch target buffer 28. Other data and control signals can be communicated via single or multiple conductors between the control and interface unit 52 and the internal bus 24 for implementing data processing instruction execution, as required.

In the illustrated form of this portion of CPU 30, the control and interface unit 52 controls the instruction fetch unit 40 to selectively identify and implement the fetching of instructions including the fetching of groups of instructions. The instruction decode unit 46 performs instruction decoding for the one or more execution unit(s) 48. The register file 50 is used to support the one or more execution unit(s) 48. Within the control and interface unit 52 is address generation circuitry 54. The address generation circuitry 54 sends out a branch instruction address to the BTB 28 to obtain multiple instructions. In response to the branch instruction address, a BTB target address is provided to the CPU 30 to identify an address of a group of instructions. The BTB target address is used by CPU 30 to obtain an operand at the target address from either cache 26 or from memory 16 if the address is not present and valid within cache 26.

Illustrated in FIG. 3 is further detail of a portion of the BTB 28. A register 60 stores (N+1) BTB entries 64 where N is an integer. The register 60 has an input/output terminal coupled to an input/output terminal of a BTB control circuit 62 via a bidirectional multiple conductor bus. The BTB control circuit 62 also has inputs for receiving the branch instruction address, lock control, and lock amount signals from the CPU 30. BTB control circuit 62 includes lock control logic 66, which sets lock indicators for the entries in BTB register 60 based on the lock control indicator and lock amount signal from the CPU 30 and a fullness level of the BTB register 60. BTB control circuit 62 provides the BTB Hit Indicator and the BTB Target Address signals.

In operation, a branch instruction address is received from the CPU 30. The BTB control circuit 62 determines whether the requested branch instruction address exists in the register 60. If so, the BTB Hit Indicator signal is asserted. If not, the BTB Hit Indicator is not asserted and the CPU 30 determines that the MMU 32 needs to provide the BTB Target Address associated with the Branch instruction address. The missing entry is typically provided from the memory 16. In addition to asserting the BTB Hit Indicator signal, the BTB control circuit 62 retrieves the requested BTB Target Address from the correct entry and outputs the BTB Target Address to the CPU 30.

If an unlocked BTB entry 64 is available, the BTB control circuit 62 may fill the unlocked BTB entry 64 with the branch instruction address, corresponding branch target address once available from the CPU 30, as well as other information including a lock indicator for the entry 64. To set the lock indicator for an entry 64, lock control logic 66 reads the lock control signal to determine whether to lock any of the entries in BTB register 60. If the lock control signal indicates that locking is enabled, lock control logic 66 determines the percentage or number of entries 64 to lock using the lock amount signal. For example, the lock amount signal may be set to a percentage such as 25%, 50%, 75%, 100%, or other suitable percentage. Alternatively, the lock amount may be set to a particular number that is less than or equal to the total number of entries 64 in BTB register 60. Lock control logic 66 keeps track of the number or percentage of entries 64 that occupy BTB register 60. Once the number or percentage of entries equals the lock amount signal, then the current entries 64 are locked and cannot be used to store information for a new entry. Information in remaining unlocked entries 64, if any, may still be overwritten with new information. Once locked, entries 64 remain locked as long as the current set of instructions or routine continues executing. If CPU 30 starts executing a new set of program instructions or routine, entries 64 in BTB register 60 are flushed and invalidated, which also causes any locked entries 64 to be unlocked.

Illustrated in FIG. 4 is a first embodiment of a BTB entry 64 in the register 60 of FIG. 3. The entry 64 can have any suitable number of bits that are allocated in fields for a Branch Instruction Address, a Branch Target Address, a LOCK indicator, a predicted (PRED) indicator, and a VALID indicator. The Branch Instruction Address field contains a predetermined number of bits related to the branch instruction address the entry is correlated. The BTB control circuit 62 compares the Branch Instruction Address with a current branch instruction address provided by the CPU 30 to determine whether the entry contains the instruction that is being addressed. If there is a match, the BTB control circuit 62 then checks the VALID indicator in the entry 64 to determine if the branch target address is valid. The BTB control circuit 62 also determines whether the valid branch target address is predicted to be taken using the PRED indicator in the entry 64. If the PRED indicator indicates the valid branch target address is predicted to be taken, then the BTB control circuit 62 asserts the BTB Hit Indicator signal. If not, the BTB Hit Indicator signal is not asserted. Once lock control logic 66 determines that the number of entries equals the lock amount, then the LOCK indicators in the current entries 64 are set to indicate the entries 64 are locked.

By now it should be appreciated that, in some embodiments, there has been provided a data processing system that can include a processor configured to execute processor instructions. A branch target buffer can have a plurality of entries, each entry configured to store a branch target address and a lock indicator. The lock indicator indicates whether the entry is a candidate for replacement. The processor is configured to access the branch target buffer during execution of the processor instructions. Control circuitry can be configured to determine a fullness level of the branch target buffer. In response to the fullness level reaching a fullness threshold, the control circuitry can be configured to assert the lock indicator of one or more of the plurality of entries to indicate that the one or more of the plurality of entries is not a candidate for replacement.

In another aspect, the branch target buffer can be configured to, in response to a hit of a processor instruction in the branch target buffer, provide a branch target address to the processor.

In another aspect, the fullness level of the branch target buffer can indicate a percentage of valid entries of the plurality of entries branch target buffer.

In another aspect, each entry of the branch target buffer can be configured to store a valid indicator.

In another aspect, the one or more of the plurality of entries can comprise all of the plurality of entries of the branch target buffer.

In another aspect, the branch target buffer is further characterized as set associative, wherein the control circuitry is configured to determine a fullness level of a set of the branch target buffer. In response to the fullness level reaching the fullness threshold, the lock indicator can be asserted for one or more entries in the set.

In another aspect, the control circuitry can be configured to store a lock amount indicator, wherein the lock amount indicator indicates the fullness threshold.

In another aspect, the lock amount indicator can indicate the one or more of the plurality of entries whose lock indicator is asserted.

In another aspect, the branch target buffer can be configured to, in response to a miss of a processor access of the branch target buffer, select an entry for replacement from entries of the branch target buffer whose lock indicator is not asserted.

In other embodiments, in a data processing system having a branch target buffer, a method can comprise determining a fullness level of the branch target buffer based on a number of valid entries in the branch target buffer. Whether the fullness level of the branch target buffer has reached a fullness threshold can be determined. When the fullness level of the branch target buffer reaches the fullness threshold, one or more entries of the branch target buffer can be locked to cause the one or more entries to not be candidates for replacement.

In another aspect, the method can further comprise receiving a lock amount indicator, wherein the lock amount indicator indicates the fullness threshold.

In another aspect, the lock amount indicator can indicate the one or more entries.

In another aspect, the locking the one or more entries can comprise locking all entries of the branch target buffer.

In another aspect, the method can further comprise determining that a processor instruction results in a miss in the branch target buffer. An entry of the branch target buffer which is not locked can be selected for replacement. The selected entry can be updated with the processor instruction.

In another aspect, the fullness level of the branch target buffer can indicate a percentage of valid entries of the plurality of entries branch target buffer.

In still other embodiments, a data processing system can comprise a processor configured to execute processor instructions, and a branch target buffer having a plurality of entries. Each entry can be configured to store a branch target address, a valid indictor, and a lock indicator. The lock indicator can indicate whether the entry is a candidate for replacement. The processor can be configured to access the branch target buffer during execution of the processor instructions. Storage circuitry can be configured to store a lock amount indicator. The lock amount indicator can indicate a percentage of entries of the branch target buffer. Control circuitry can be configured to determine a fullness level of the branch target buffer based on valid entries of the branch target buffer. In response to the fullness level reaching a fullness threshold, the control circuitry can be configured to assert the lock indicator of one or more entries of branch target buffer which achieves the percentage of entries of the branch target buffer indicated by the lock amount indicator to indicate that the one or more of the plurality of entries is not a candidate for replacement.

In another aspect, the lock amount indicator can indicate the fullness threshold.

In another aspect, the fullness level of the branch target buffer can indicate a percentage of valid entries of the plurality of entries branch target buffer.

In another aspect, the branch target buffer can be further characterized as set associative. The control circuitry can be configured to determine a fullness level of a set of the branch target buffer. In response to the fullness level reaching the fullness threshold, the lock indicator of one or more entries in the set which achieves the percentage of entries indicated by the lock amount indicator can be asserted.

In another aspect, the branch target buffer can be configured to, in response to a miss of a processor instruction in the branch target buffer, select an entry for replacement from entries of the branch target buffer whose lock indicator is not asserted.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 16 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of bits used in the address fields may be modified based upon system requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system, comprising:
   a processor configured to execute processor instructions;
   a branch target buffer having a plurality of entries, each entry configured to store a branch target address and a lock indicator, wherein the lock indicator indicates whether the entry is a candidate for replacement, and wherein the processor is configured to access the branch target buffer during execution of the processor instructions; and
   control circuitry configured to determine a fullness level of the branch target buffer, wherein in response to the fullness level reaching a fullness threshold, the control circuitry is configured to assert the lock indicator of one or more of the plurality of entries to indicate that the one or more of the plurality of entries is not a candidate for replacement,
   wherein the control circuitry is configured to determine a fullness level of a set of the branch target buffer,
   in response to the fullness level reaching the fullness threshold, asserting the lock indicator for one or more entries in the set, and
   the branch target buffer is configured to, in response to a miss of a processor access of the branch target buffer, select an entry for replacement from entries of the branch target buffer whose lock indicator is not asserted.

2. The data processing system of claim 1, wherein the branch target buffer is configured to, in response to a hit of a processor instruction in the branch target buffer, provide a branch target address to the processor.

3. The data processing system of claim 1, wherein the fullness level of the branch target buffer indicates a percentage of valid entries of the plurality of entries branch target buffer.

4. The data processing system of claim 3, wherein each entry of the branch target buffer is configured to store a valid indicator.

5. The data processing system of claim 3, wherein the one or more of the plurality of entries comprises all of the plurality of entries of the branch target buffer.

6. The data processing system of claim 3, wherein the branch target buffer is further characterized as set associative.

7. The data processing system of claim 1, wherein the control circuitry is configured to store a lock amount indicator, wherein the lock amount indicator indicates the fullness threshold.

8. The data processing system of claim 7, wherein the lock amount indicator indicates the one or more of the plurality of entries whose lock indicator is asserted.

9. In a data processing system having a branch target buffer, a method comprising:
   determining a fullness level of the branch target buffer based on a number of valid entries in the branch target buffer;
   determining whether the fullness level of the branch target buffer has reached a fullness threshold;
   when the fullness level of the branch target buffer reaches the fullness threshold, locking one or more entries of the branch target buffer to cause the one or more entries to not be candidates for replacement;
   determining that a processor instruction results in a miss in the branch target buffer;
   selecting an entry of the branch target buffer for replacement which is not locked; and
   updating the selected entry with the processor instruction,
   wherein the control circuitry is configured to determine a fullness level of a set of the branch target buffer, and in response to the fullness level reaching the fullness threshold, asserting a lock indicator for one or more entries in the branch target buffer.

10. The method of claim 9, further comprising:
   receiving a lock amount indicator, wherein the lock amount indicator indicates the fullness threshold.

11. The method of claim 10, wherein the lock amount indicator indicates the one or more entries.

12. The method of claim 9, wherein the locking the one or more entries comprises locking all entries of the branch target buffer.

13. The method of claim 9, wherein the fullness level of the branch target buffer indicates a percentage of valid entries of the plurality of entries branch target buffer.

14. A data processing system, comprising:
   a processor configured to execute processor instructions;
   a branch target buffer having a plurality of entries, each entry configured to store a branch target address, a valid indicator, and a lock indicator, wherein the lock indicator indicates whether the entry is a candidate for replacement, and wherein the processor is configured to access the branch target buffer during execution of the processor instructions;
   storage circuitry configured to store a lock amount indicator, wherein the lock amount indicator indicates a percentage of entries of the branch target buffer; and
   control circuitry configured to determine a fullness level of the branch target buffer based on valid entries of the branch target buffer, wherein in response to the fullness level reaching a fullness threshold, the control circuitry is configured to assert the lock indicator of one or more entries of branch target buffer which achieves the percentage of entries of the branch target buffer indicated by the lock amount indicator to indicate that the one or more of the plurality of entries is not a candidate for replacement,
   wherein the control circuitry is configured to determine a fullness level of a set of the branch target buffer,
   wherein in response to the fullness level reaching the fullness threshold, asserting the lock indicator of one or more entries in the set which achieves the percentage of entries indicated by the lock amount indicator, and
   the branch target buffer is configured to, in response to a miss of a processor instruction in the branch target buffer, select an entry for replacement from entries of the branch target buffer whose lock indicator is not asserted.

15. The data processing system of claim 14, wherein the lock amount indicator indicates the fullness threshold.

16. The data processing system of claim 14, wherein the fullness level of the branch target buffer indicates a percentage of valid entries of the plurality of entries branch target buffer.

17. The data processing system of claim 14, wherein the branch target buffer is further characterized as set associative.

* * * * *